United States Patent
Bui et al.

(10) Patent No.: US 6,934,772 B2
(45) Date of Patent: *Aug. 23, 2005

(54) LOWERING DISPLAY POWER CONSUMPTION BY DITHERING BRIGHTNESS

(75) Inventors: Vinh X. Bui, Houston, TX (US); Tuan Pham, Houston, TX (US)

(73) Assignee: Hewlett-Packard Development Company, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 6 days.

(21) Appl. No.: 09/164,527

(22) Filed: Sep. 30, 1998

(65) Prior Publication Data

US 2002/0147861 A1 Oct. 10, 2002

(51) Int. Cl.[7] ............................................. G06F 13/14
(52) U.S. Cl. ..................... 710/14; 315/174; 345/98; 345/102; 345/212; 345/213
(58) Field of Search ................. 710/1, 14; 315/194; 345/212, 213, 98, 102, 147

(56) References Cited

U.S. PATENT DOCUMENTS

| | | | | |
|---|---|---|---|---|
| 4,097,782 A | | 6/1978 | Chambliss | 315/209 R |
| 4,293,796 A | | 10/1981 | McMorrow | 315/205 |
| 4,755,752 A | * | 7/1988 | Fitzpatrick | 324/228 |
| 5,144,292 A | * | 9/1992 | Shiraishi et al. | 345/102 |
| 5,488,387 A | * | 1/1996 | Maeda et al. | 345/89 |
| 5,493,685 A | * | 2/1996 | Zenda | 713/340 |
| 5,598,565 A | | 1/1997 | Reinhardt | |
| 5,684,502 A | | 11/1997 | Fukui et al. | 345/95 |
| 5,734,367 A | | 3/1998 | Tsuboyama et al. | 345/101 |
| 5,754,013 A | | 5/1998 | Praiswater | 315/307 |
| 5,796,382 A | | 8/1998 | Beeteson | 345/102 |
| 5,818,172 A | * | 10/1998 | Lee | 315/86 |
| 5,854,617 A | | 12/1998 | Lee et al. | 345/102 |
| 5,864,336 A | | 1/1999 | Yano | 713/321 |
| 5,867,140 A | | 2/1999 | Rader | 345/98 |
| 5,886,689 A | | 3/1999 | Chee et al. | 345/212 |
| 5,917,479 A | | 6/1999 | Haapakoski | 345/211 |
| 5,926,173 A | * | 7/1999 | Moon | 345/211 |
| 5,933,130 A | * | 8/1999 | Wagner | 345/147 |
| 6,011,534 A | | 1/2000 | Tanaka et al. | 345/98 |
| 6,020,879 A | * | 2/2000 | Nakabayashi | 345/212 |
| 6,025,829 A | | 2/2000 | DeLucia et al. | 345/149 |
| 6,028,597 A | | 2/2000 | Ryan, Jr. et al. | 345/211 |
| 6,051,932 A | | 4/2000 | Sheu et al. | 315/169.3 |
| 6,052,791 A | | 4/2000 | Chen et al. | 713/300 |
| 6,061,282 A | | 5/2000 | Tamaki | 365/201 |
| 6,151,008 A | | 11/2000 | Zhang | 345/102 |
| 6,160,541 A | | 12/2000 | Palalau et al. | 345/211 |

* cited by examiner

Primary Examiner—Jeffrey Gaffin
Assistant Examiner—Abdelmoniem Elamin

(57) ABSTRACT

A method for reducing video display power usage by dithering the brightness. This method can be used to reduce power consumption without having an effect on the brightness of the display screen as perceived by the user or may further reduce the power consumed with a corresponding reduction of brightness.

60 Claims, 2 Drawing Sheets

LOWERING DISPLAY POWER CONSUMPTION BY DITHERING BRIGHTNESS

BACKGROUND AND SUMMARY OF THE INVENTION

The present invention relates to the reduction of power consumption by display devices, particularly display devices found in portable computer systems.

Background: Reducing Power Consumption

The reduction of power in an electronic device reduces cost of operation and potential environmental impact. Reducing power consumption is particularly important in the case of portable electronic devices. A truly portable electronic device normally operates using only the power obtained from an internal electric battery. The batteries used in portable electronic devices tend to be very small, in order to minimize overall weight and size of the device, enhancing portability. Because of their reduced size, small electric batteries can provide only very limited amounts of power. Thus, it follows that portable electronic devices should be designed in a manner such that power consumption is minimized.

In order to reduce power requirements, many electronic devices implement power management systems that reduce the amount of power consumed, based on anticipated use. Some portable computer systems use power management systems that reduce the amount of power consumed by internal components, e.g., hard disk drive storage devices. The power management system monitors the use of the hard disk drive storage device. When the power management system determines that the hard disk drive has been inactive for a certain amount of time, the system parks the read/write head of the hard disk drive and spins down the physical hard disk. Thus, the power consumed by the drive is reduced and battery power is conserved. This general approach may be applied to other areas, including display systems.

Background: Display Systems

Many portable electronic devices use some type of flat panel display system to display information to a user. For example, portable computers, portable televisions, and hand-held video games are constructed using a flat panel display system. Examples of flat panel display systems include liquid crystal displays (LCD), including passive matrix LCDs, active matrix LCDs, and plasma-addressed liquid crystal (PALC). Other display types include cathode-ray tubes (CRT), electroluminescent displays, field-emission cathode displays, gas-plasma displays, Light Emitting Diode (LED) displays and AC plasma display panels (ACPDP).

The display system in a portable electronic device can draw significant amounts of power. It is therefore desirable to implement a power management system that reduces the amount of power consumed by the flat panel display system in a portable electronic device.

Background: Reducing Screen Power

In U.S. Pat. No. 5,598,565, a method is disclosed for reducing the power consumption of a flat panel display. The proposed method used to reduce the power required by a flat panel display is the implementation of a special reduced power mode. In this reduced power mode, a subset of pixels that is considered to be "unimportant" receives a reduced amount of power, relative to a subset of pixels that is considered important. FIG. 2 shows an example of a screen display using this method. In FIG. 2 a subset of pixels 330 (in the vicinity of the cursor 340) is selected as important. Other pixels 310 and 320 in the same display are then considered "unimportant" and receive a reduced amount of power.

The method of power reduction disclosed in U.S. Pat. No. 5,598,565 suffers from several shortcomings. The first disadvantage of the method is that it does nothing to reduce the power consumption of a display in its normal operating mode. The method is used only in a reduced activity, power saving mode. If the computer is not in this mode, which would be the case if there were a sufficient amount of activity, potentially no power savings would take place.

A second disadvantage of such a method is that it is noticeable to the user during its operation. It is obvious to the user that some pixels are clearly displayed, while others are obscured or dim. It does nothing to reduce the power consumption of the pixels that are displayed at full power, while the visibility of those whose power has been reduced is diminished.

Another shortcoming of the method is that for backlit LCD displays, it teaches a reduction of the refresh rate, which also results in an inferior display. This is particularly true in a situation that would normally require frequent screen updates, such as in animation.

Background: Alpha-Wave-Synchronized Flicker

An interesting scientific curiosity is that flickering illumination in the neighborhood of the human brain's alpha-wave frequencies (around ten Hertz) will tend to be subjectively assessed, by human observers, as brighter than it really is. See R. Kuehn & H. Luxenberg, *DISPLAY SYSTEMS ENGINEERING* 109 (1968), incorporated herein by reference. However, such low frequencies are below the normal refresh rate of displays (which are designed to be apparently flicker-free).

Lowering Power Consumption by Dithering Brightness

The present application discloses a display power reduction method applicable to a broad variety of screen displays, including LCDs and other display types which permit the display brightness to be dithered without loss of perceived brightness by the user. By dithering the brightness of the screen between two or more different levels within a particular range of times, power consumption is reduced while maintaining an apparently normal appearance. Thus, the operation of the method is transparent and generally not detectable to the user. Further it is not necessary that the method be selected, as in "reduced activity" type methods. This method may instead be considered to be the normal method of display operation. The user may be given control of some optional parameters of this method. Some settings may allow the dithering to become noticeable to the user but tolerable given the lower power consumption and hence, longer running time afforded by the settings.

An advantage of the disclosed method is that it is not readily noticed by the user, while still providing full functionality.

Another advantage of the disclosed method is that it is applicable to the entire screen display and does not require the selection of a subset of pixels which are displayed at a lower brightness. It enables the user to reduce power consumption and still retain full operational functionality, thereby conserving power in a normal mode of use.

Another advantage of the disclosed method is that it may be used without affecting the refresh rate of the video display, thereby maintaining image quality which is particularly useful for viewing animation or video.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
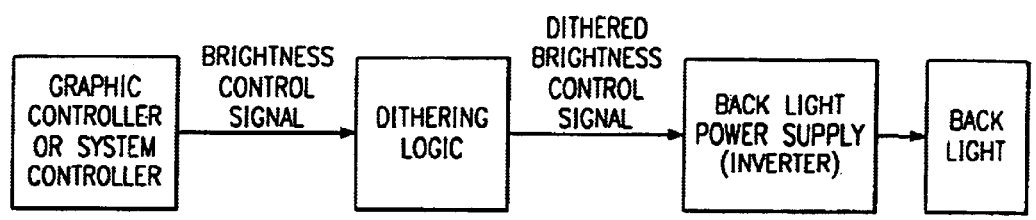
FIG. 1 shows a block diagram of a dithered brightness control system according to the presently preferred embodiment.
Figure 2:
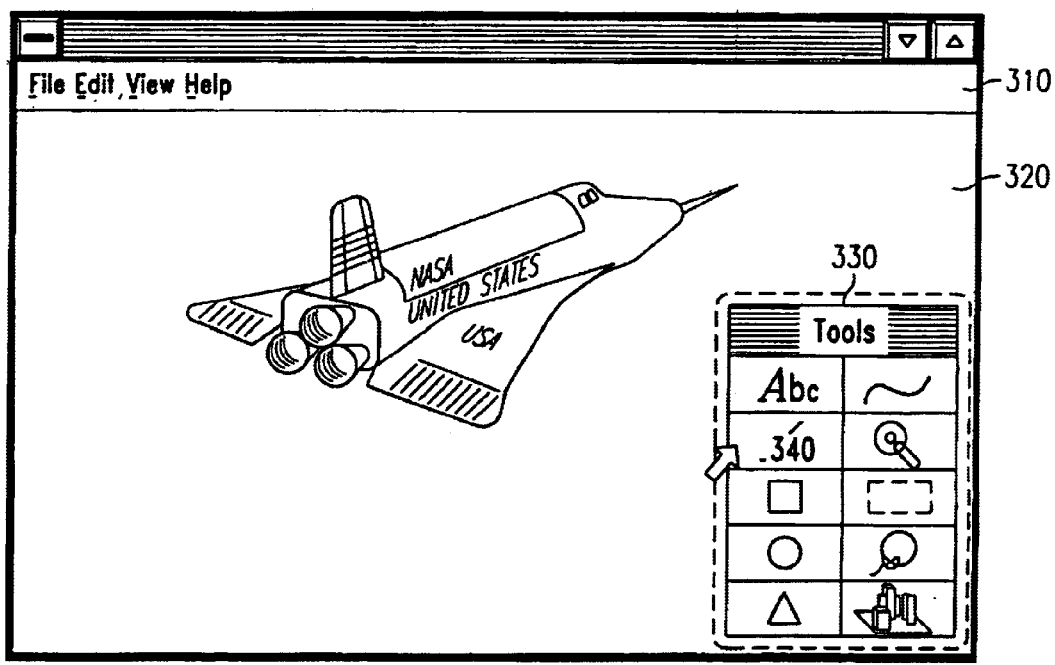
FIG. 2 shows a screen image incorporating the method of U.S. Pat. No. 5,598,565.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Power Reduction by Dithering

The present application disclosed a method of reducing the power consumption of a video display. In the presently preferred embodiment, reduction of the power consumption of a video display is accomplished by alternating the display of information between different brightness levels (or "dithering"). Dithering of the display screen can take place at any rate up to the refresh rate of the display. An effect of dithering is that power is conserved as the display operates at lower brightness levels for at least part of the time. In the presently preferred embodiment, the display is dithered within a narrow range of time periods and brightness levels such that the change in brightness level is unnoticed by the human eye. This form of dithering results in a perceived normal (or close to normal) level of brightness by the viewer of the display while reducing power consumption.

Selection of the dithering rate depends, in part, on the characteristics of the display and its design. Similarly, the specific algorithm for alternating between the intensity levels of the display can be optimized for the design of the display. Psychological studies of eye response to dithered displays may lead to more precise determination of the optimal dithering rate for the ideal perceived image appearance, and for determining an optimal power consumption versus appearance relationship.

The brightness level of a portable computer can be controlled through various means. As is common in portable computers with modern operating systems, the brightness level of the display screen can be controlled by software. Users of portable computer systems usually control the brightness level of the display screen through a software control panel. In the presently preferred embodiment, a portable computer with four different brightness controls: High (75% of available brightness), Medium (50% of available brightness), Drain (100% of available brightness), and Custom (0–100% of available brightness) is contemplated. All of the brightness controls can be configured by the user. Generally, for LCD-type screens, a brightness of below 50% will look very dim and is not recommended.

Drain Mode

The disclosed dithering method is designed for use with the Drain mode. The Drain mode provides the maximum available brightness from the display screen of the portable. In Drain mode, the power consumption of the display screen is at its peak. As a result, the power of the battery is rapidly depleted. Dithering of the display helps to overcome this rapid loss of battery power. In the presently preferred embodiment, the display screen is dithered between 100% brightness and High (75% brightness) at a rate of 2 milliseconds (or 500 Hz). A rate of 2 milliseconds, as shown in the sample results below, allows for a significant increase in battery life over a display screen in Drain mode without dithering. Moreover, a dither of 2 milliseconds is imperceptible to a user of the portable.

Dithering the Portable Display Screen

The block diagram in FIG. 1 shows a simplified architecture of a dithered brightness control system. In most systems, the graphic or keyboard/system controller usually outputs a fixed level 5 brightness control signal. This signal is usually a voltage level (analog control) or a pulse width modulator (PWM), a type of digital control signal. A dithering logic block converts this output to alternate cycles of higher and lower brightness levels in short duration (e.g., 2 milliseconds). Other algorithms for alternating the level of brightness may be used as well, dependent upon the bulb and inverter characteristics, and the desired display appearance. The dithered control signal is then output to the bulb's power supply. The power supply directly controls the back light brightness level.

Sample Test Results

In the presently preferred embodiment, the reduction of power consumed by the back light of an LCD display of a portable computer is achieved by dithering between full and half levels of brightness, remaining at each level for a duration of 2 milliseconds. The display shows no perceivable loss of brightness, or flicker.

Tests were run using these parameters, with the results given below. These test results reveal that a significant quantity of battery power is conserved, as is shown in the following tables which summarize the experimental results. The computer used for these tests was a Compaq Armada 7750MT portable.

|  | Battery Life | |
| --- | --- | --- |
|  | Test 1 | Test 2 |
| No Dither | 116 Minutes | 114 Minutes |
| Dither | 124 Minutes | 121 Minutes |
| Battery Life Saving | 8 Minutes | 7 Minutes |
| No Dither | 113 Minutes | 108 Minutes |
| Dither | 124 Minutes | 122 Minutes |
| Battery Life Saving | 11 Minutes | 14 Minutes |

In the table above it can be seen that significant increases in the operating life of a portable battery are achieved by reducing the display power consumption by the disclosed method. Further modifications of the technique may permit even greater savings with a corresponding increase in battery life.

Alternative Embodiments

Although the presently preferred embodiment for the disclosed dithering method is a 100%/75% brightness level alternating at 2 milliseconds each, it is possible to both reduce power consumption by dithering and remain user transparent with other parameters. For instance, the time of display for each brightness level does not have to be equal. The screen can be dithered with the higher brightness level lasting a shorter time, for example, around 1 millisecond, and the lower brightness level lasting a longer time, for example, up to 5 milliseconds. Higher brightness levels should be dithered at a rate of no longer than about 2 milliseconds as longer rates will tend to cause noticeable flicker in the display screen.

It is also possible to dither the screen to preserve battery power at brightness levels other than those of the Drain mode. For instance, even in High mode, the brightness level can be dithered offering increased battery life without noticeably sacrificing display brightness. Dithering can even take place in Custom mode between the user selected brightness level and a lower level.

Although the presently preferred embodiment dithers between 100% and 75% brightness, the disclosed method of dithering can be effective to increase battery life without drastically effecting display brightness with many high/low brightness combinations. For instance, high and low brightness combinations can include 100%/50%, 100%/25%, 75%/50%, or any custom combination. Using this approach, at any given apparent brightness level, the power consumed is still lower than it would be otherwise. Even though multiple combinations are possible with some increased battery life anticipated, it is recommended that dithering be used when the brightness level is set between 75%–100% for a preferred visual result and maximum battery life increase.

System Embodiment

Figure 3:
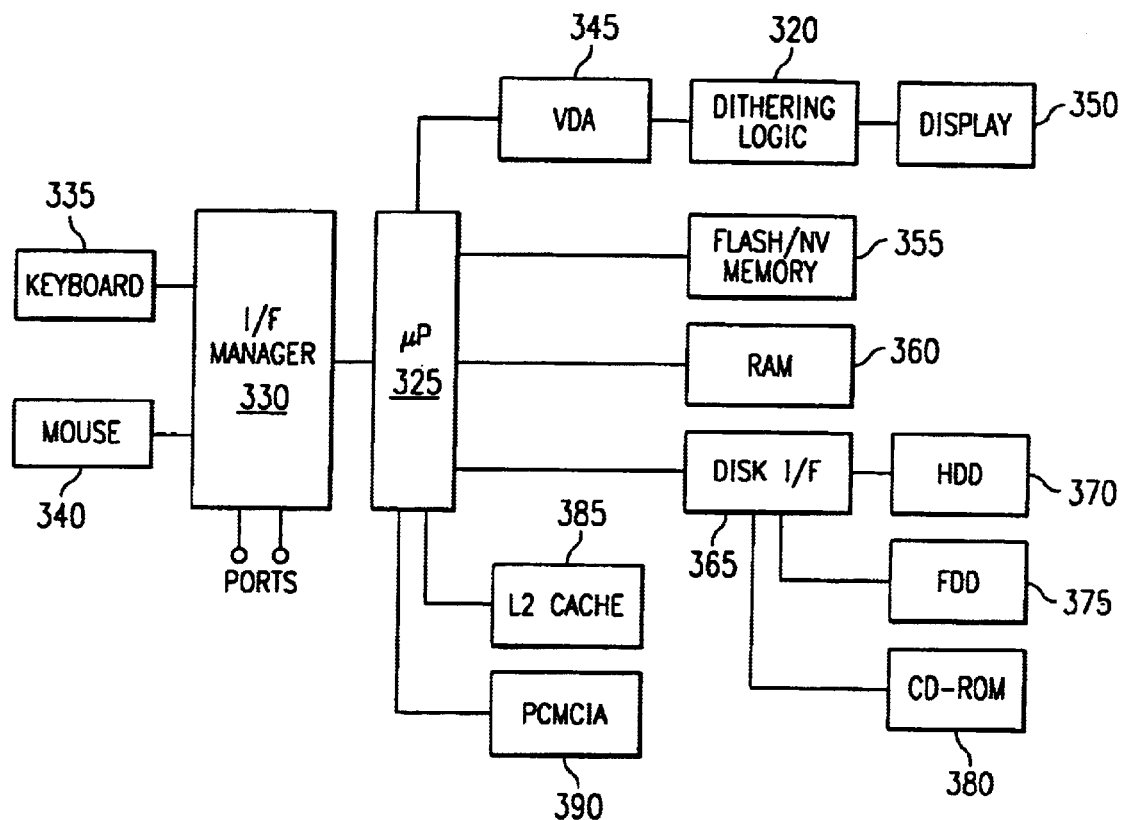
FIG. 3 shows a block diagram of a sample microcomputer system incorporating the innovative method.

FIG. 3 illustrates a complete portable computer system, which includes in this example:
- user input devices (e.g. keyboard 335 and mouse 340);
- at least one microprocessor 325 which is operatively connected to receive inputs from said input device, through an interface manager chip 330 (which also provides an interface to the various ports);
- an L2 cache 385 and PCMCIA 390 interfaces;
- a memory (e.g. flash memory 355 and RAM 360), which is accessible by the microprocessor;
- a data output device (e.g. display 350 in conjunction with a video display adapter card 345, and the dithering logic module 320 for controlling the display brightness) which is connected to output data generated by microprocessor;
- a magnetic disk drive 370 which is read-write accessible, through an interface unit 365, by the microprocessor;
- in a manner similar to the magnetic disk drive, a floppy disk drive 375 and a cd-rom drive 80 are also connected.

According to a disclosed class of innovative embodiments, there is provided: a method for reducing power consumption of a video display device, comprising the actions of: in at least one mode of display operation, displaying data alternately at first and second brightness levels; wherein power is conserved while maintaining apparent brightness.

According to another disclosed class of innovative embodiments, there is provided: a method for reducing power consumption of a video display device, comprising the actions of: in a first mode of display operation, displaying data alternately at first and second brightness levels; in a second mode of display operation, displaying data only at a single brightness level; wherein power is conserved while maintaining apparent brightness.

According to another disclosed class of innovative embodiments, there is provided: a method for reducing power consumption of a video display device, comprising the actions of: in a first mode of display operation, displaying data alternately at a first brightness level and at a second brightness level which is brighter than said first brightness level; in a second mode of display operation, displaying data only at said first brightness level; wherein said first mode provides greater brightness than said second mode, while conserving power.

According to another disclosed class of innovative embodiments, there is provided: a computer system, comprising: a user input device, at least one microprocessor which is operatively connected to detect inputs from said input device, random-access memory which is connected to be read/write accessible by said microprocessor; power supply circuitry, connected to provide power to said microprocessor and said memory; and a video display device operatively connected to receive display data output from said microprocessor and display said display data alternately at first and second brightness levels; wherein power is conserved while maintaining apparent brightness.

According to another disclosed class of innovative embodiments, there is provided: a computer system, comprising: a user input device, at least one microprocessor which is operatively connected to detect inputs from said input device, random-access memory which is connected to be read/write accessible by said microprocessor; power supply circuitry, connected to provide power to said microprocessor and said memory; and a video display device operatively connected to receive display data from said microprocessor and in a first mode of display operation, display said display data alternately at first and second brightness levels and in a second mode of display operation, display data only at a single brightness level; wherein said display is connected so that power is conserved while maintaining apparent brightness.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, although the preferred embodiment is described as having four brightness settings, the disclosed method can exist on a computer with a "normal" visual mode. Alternatively, adjustments to the parameters controlling the dithering may be provided such that one or more reduced power modes can be accessed from the portable computer. For example, when the computer is plugged into an AC supply and the battery is charged, dithering can be avoided. Such power modes reduce power consumption, but also lower the apparent brightness. Using this approach, at any given apparent brightness level, the power consumed is still lower than it would be otherwise.

For another example, various algorithms for adjusting the rate, duration, or intensity level of the brighter or dimmer phases of flickering may be controlled by the computer or selected by the user. User control could also be extended to having multiple selectable levels of flickering, e.g. high, medium and low, whose particular characteristics could also be controlled, as well as the sequence with which they are displayed. The computer may be programmed to use time and/or level of user activity to select these options, or they may chosen by the user.

For another example, the dithering logic may be used as a separate device as shown in FIG. 3. It may be combined with or located within other components, such as the video display adapter card, or even reside within the display device itself.

For another example, this dithering technique could be used with a method for selecting subsets of pixels, deemed to be less important, for dithering at a different brightness level than other, more important pixels.

For another example, the power-conserving dither rate can be the system default rate, which is enabled when the system is first started.

For another example, the ratio between the high-brightness and low-brightness periods can optionally be adjusted.

For another example, multiple dithered rates can be used if desired, possibly with different dither frequencies in each different mode.

Finally, these methods need not be limited to a particular display type or use, but may be used in any visual display situation where reduction of power consumption is desired, and the level of image brightness may be dithered with a net reduction in power.

Additional general background, which helps to show the knowledge of those skilled in the art regarding the system context, and of variations and options for implementations, may be found in the following publications, all of which are hereby incorporated by reference: Richard A. Perez, *ELECTRONIC DISPLAY DEVICES*; Andrew Inglis, Arch Luther, *VIDEO ENGINEERING* (2nd ed.); and Luxenberg and Kuehn, *DISPLAY SYSTEMS ENGINEERING*. In particular, many details may be found in the books from MindShare, Inc., including *PROTECTED MODE SOFTWARE ARCHITECTURE, CARDBUS SYSTEM ARCHITECTURE, EISA SYSTEM ARCHITECTURE, ISA SYSTEM ARCHITECTURE, 80486 SYSTEM ARCHITECTURE, PENTIUM PROCESSOR SYSTEM ARCHITECTURE, PCMCIA SYSTEM ARCHITECTURE, PLUG AND PLAY SYSTEM ARCHITECTURE, PCI SYSTEM ARCHITECTURE, USB SYSTEM ARCHITECTURE*, and *PENTIUM PRO PROCESSOR SYSTEM ARCHITECTURE*, all of which are hereby incorporated by reference, and in the *PENTIUM PROCESSOR FAMILY DEVELOPER'S MANUAL* 1997, the *MULTIPROCESSOR SPECIFICATION* (1997), the *INTEL ARCHITECTURE OPTIMIZATIONS MANUAL*, the *INTEL ARCHITECTURE SOFTWARE DEVELOPER'S MANUAL*, the *PERIPHERAL COMPONENTS* 1996 databook, the *PENTIUM PRO PROCESSOR BIOS WRITER'S GUIDE* (version 2.0, 1996), and the *PENTIUM PRO FAMILY DEVELOPER'S MANUALS* from Intel, all of which are hereby incorporated by reference.

What is claimed is:

1. A method for reducing power consumption of a video display device, comprising the acts of:
    in at least one mode of display operation, dithering data between first and second brightness levels;
    wherein power is conserved while maintaining apparent brightness.

2. The method of claim 1, wherein at least one said mode is one of plural selectable modes, and at least one other said mode provides substantially constant brightness.

3. The method of claim 1, wherein said first brightness level is brighter than said second brightness level.

4. The method of claim 1, wherein said first and second brightness levels are alternated at a rate which is higher than the frame rate.

5. The method of claim 1, wherein said first brightness level operates at approximately 100% power, and said second brightness level operates at approximately 75% power.

6. The method of claim 1, wherein said first brightness level is between 100% and 50% and said second brightness level is ½ of said first brightness level.

7. The method of claim 1, wherein said brightness levels are software controlled.

8. The method of claim 1, wherein said brightness levels are alternated at time intervals which are software controlled.

9. The method of claim 1, wherein said first brightness level is displayed for a shorter time interval than said second brightness level.

10. The method of claim 1, wherein the brightness level of said first and second brightness levels is user configurable.

11. The method of claim 1, wherein said data encompasses all pixels of said video display device.

12. The method of claim 1, wherein said data encompasses some but not all pixels of said video display device.

13. The method of claim 1, wherein said displaying step is performed only when a user has selected a reduced power display mode.

14. The method of claim 1, wherein said brightness levels are controlled by varying power to a backlight which is controlled separately from the individual pixels of said video display device.

15. The method set forth in claim 1 wherein the act of dithering data between first and second brightness levels is performed at a frequency of 500 Hz or higher.

16. A method for reducing power consumption of a video display device, comprising the acts of:
    in a first mode of display operation, dithering data between first and second brightness levels;
    in a second mode of display operation, displaying data only at a single brightness level;
    wherein power is conserved while maintaining apparent brightness.

17. The method of claim 16, wherein said brightness levels are software controlled.

18. The method of claim 16, wherein said brightness levels are alternated at time intervals which are software controlled.

19. The method of claim 16, wherein said first brightness level is displayed for a shorter time interval than said second brightness level.

20. The method of claim 16, wherein said alternately displaying step is performed only when a user has selected a reduced power display mode.

21. The method of claim 16, wherein said alternately displaying step is performed by varying power to a backlight which is controlled separately from the pixels of the display.

22. The method set forth in claim 16 wherein the act of dithering data between first and second brightness levels is performed at a frequency of 500 Hz or higher.

23. A method for reducing power consumption of a video display device, comprising the acts of:
    in a first mode of display operation, dithering data between a first brightness level and a second brightness level which is brighter than the first brightness level;
    in a second mode of display operation, displaying data only at the first brightness level;
    wherein the first mode apparently maintains the second brightness level while conserving power.

24. The method of claim 23, wherein said brightness levels are software controlled.

25. The method of claim 23, wherein said brightness levels are alternated at time intervals which are software controlled.

26. The method of claim 23, wherein said first brightness level is displayed for a shorter time interval than said second brightness level.

27. The method of claim 23, wherein said first mode is performed only when a user has selected a reduced power display mode.

28. The method of claim 23, wherein said first mode is performed by varying power to a backlight which is controlled separately from the pixels of the display.

29. The method set forth in claim 23 wherein the act of dithering data between a first brightness level and a second brightness level is performed at a frequency of 500 Hz or higher.

30. A computer system, comprising:
a user input device, at least one microprocessor which is operatively connected to detect inputs from the input device, random-access memory which is connected to be read/write accessible by the microprocessor;
power supply circuitry, connected to provide power to the microprocessor and the memory; and
a video display device operatively connected to receive display data output from the microprocessor and dither the display data between first and second brightness levels;
wherein power is conserved while maintaining apparent brightness.

31. The system of claim 30, wherein said brightness levels are software controlled.

32. The system of claim 30, wherein said brightness levels are alternated at time intervals which are software controlled.

33. The system of claim 30, wherein said first brightness level is displayed for a shorter time interval than said second brightness level.

34. The system of claim 30, wherein said brightness levels are alternated by varying power to a backlight which is controlled separately from the pixels of said video display device.

35. The computer system of claim 30 wherein the video display device is adapted to dither the display data between first and second brightness levels at a frequency of 500 Hz or higher.

36. A computer system, comprising:
a user input device, at least one microprocessor which is operatively connected to detect inputs from the input device, random-access memory which is connected to be read/write accessible by the microprocessor;
power supply circuitry, connected to provide power to the microprocessor and the memory; and
a video display device operatively connected to receive display data from the microprocessor and in a first mode of display operation, dither the display data between first and second brightness levels and in a second mode of display operation, display data only at a single brightness level;
wherein the display is connected so that power is conserved while maintaining apparent brightness.

37. The system of claim 36, wherein said brightness levels are software controlled.

38. The system of claim 36, wherein said brightness levels are alternated at time intervals which are software controlled.

39. The system of claim 36, wherein said first brightness level is displayed for a shorter time interval than said second brightness level.

40. The system of claim 36, wherein said video display device is in said first mode only when a user has selected a reduced power display mode.

41. The system of claim 36, wherein said display data is alternated by varying power to a backlight which is controlled separately from the pixels of the video display device.

42. The computer system of claim 36 wherein the video display device is adapted to dither the display data between first and second brightness levels at a frequency of 500 Hz or higher.

43. A method for reducing energy usage of a video display device, comprising the act of:
dithering between an apparent brightness level and a lower brightness level such that the apparent brightness level is perceived by a user to be maintained.

44. The method of claim 43, wherein the apparent brightness level and the lower brightness level are alternated at a rate which is higher than a frame rate of the video display device.

45. The method of claim 43, wherein the brightness levels are software controlled.

46. The method of claim 43, wherein the brightness levels are alternated at time intervals which are software controlled.

47. The method of claim 43, wherein the act of alternating is performed when AC power is removed from the device.

48. The method of claim 47, wherein the act of alternating is performed when a battery of the device is not fully charged.

49. The method of claim 43, wherein the apparent brightness level is displayed for a shorter time interval than the lower brightness level.

50. The method of claim 43, wherein the act of alternating between brightness level is performed only when a user has selected a reduced power display mode.

51. The method set forth in claim 43 wherein the act of dithering between an apparent brightness level and a lower brightness level is performed at a frequency of 500 Hz or higher.

52. A method for lowering power consumption by a video display device, comprising the act of:
dithering between a first power level and a second power level, the first power level corresponding to a brightness level that is apparently maintained as perceived by a user, the first power level being higher than the second power level.

53. The method of claim 52, wherein the first power level and the second power level are alternated at a rate which is higher than a frame rate of the video display device.

54. The method of claim 52, wherein the power levels are software controlled.

55. The method of claim 52, wherein the power levels are alternated at time intervals which are software controlled.

56. The method of claim 52, wherein the act of switching alternately is performed when AC power is removed from the device.

57. The method of claim 56, wherein the act of switching alternately is performed when a battery of the device is not fully charged.

58. The method of claim 52, wherein the first power level is maintained for a shorter time interval than the second power level.

59. The method of claim 52, wherein the act of switching alternately is performed only when a user has selected a reduced power display mode.

60. The method set forth in claim 52 wherein the act of dithering between a first power level and a second power level is performed at a frequency of 500 Hz or higher.

* * * * *